(12) United States Patent
Kuo et al.

(10) Patent No.: US 11,143,161 B2
(45) Date of Patent: Oct. 12, 2021

(54) WIND POWER GENERATION DEVICE

(71) Applicant: National Taiwan Normal University, Taipei (TW)

(72) Inventors: Chin-Guo Kuo, Taipei (TW); Jung-Hsuan Chen, Taipei (TW); Chao-Fu Shu, Taipei (TW); Ya-Chiao Liu, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 130 days.

(21) Appl. No.: 16/571,650

(22) Filed: Sep. 16, 2019

(65) Prior Publication Data

US 2021/0047994 A1 Feb. 18, 2021

(30) Foreign Application Priority Data

Aug. 12, 2019 (TW) .................................. 108128665

(51) Int. Cl.
| | |
|---|---|
| *F03D 3/00* | (2006.01) |
| *F03D 3/04* | (2006.01) |
| *F03D 3/02* | (2006.01) |
| *F03D 3/06* | (2006.01) |

(52) U.S. Cl.
CPC .............. *F03D 3/002* (2013.01); *F03D 3/02* (2013.01); *F03D 3/0454* (2013.01); *F03D 3/0463* (2013.01); *F03D 3/068* (2013.01)

(58) Field of Classification Search
CPC ... F03D 3/00; F03D 3/002; F03D 3/02; F03D 3/04; F03D 3/0436; F03D 3/0445; F03D 3/0454; F03D 3/067; F03D 3/068
See application file for complete search history.

(56) References Cited

U.S. PATENT DOCUMENTS 1,360,182 A * 11/1920 Cortes .................... F03D 3/0445
  415/208.5
2,409,439 A * 10/1946 Law ....................... F03D 3/0436
  415/4.1

FOREIGN PATENT DOCUMENTS

| CA | 2535088 A1 * | 8/2007 | .............. F03D 13/20 |
| DE | 3226748 A1 * | 3/1983 | ........... F03D 3/0445 |

OTHER PUBLICATIONS

Machine English Translation of DE-3226748-A1. Accessed EPO website Mar. 23, 2021. 4 Pages. (Year: 2021).*

* cited by examiner

*Primary Examiner* — Richard A Edgar
(74) *Attorney, Agent, or Firm* — Muncy, Geissler, Olds and Lowe, P.C.

(57) ABSTRACT

A wind power generation device includes a wind blocking structure, which is in a box-shaped structure fixed on ground by a bottom plane thereof; a wind vane rotating body including a rotating shaft and vanes fixed on the rotating shaft and arranged at equal angle intervals, wherein the rotating shaft is mounted on two bearings of the wind blocking structure, and the vanes are rotatable inside the box-shaped structure; a power generator connected to the rotating shaft and fixed on the box-shaped structure by a linking plate. When wind blows to the wind blocking structure to rotate the wind vane rotating body, the power generator is driven by the rotating shaft to generate electrical power. The wind power generation device can include at least two wind vane rotating bodies, or area enlarging structures added on the vanes, to increase windward areas of the vanes.

8 Claims, 8 Drawing Sheets

WIND POWER GENERATION DEVICE

This application claims priority for Taiwan patent application no. 108128665 filed on Aug. 12, 2019, the content of which is incorporated by reference in its entirely.

BACKGROUND OF THE INVENTION

1. Field of the Invention

The present invention relates to a wind power generation device, and particularly to a power generating device which utilizes vanes fixed on a rotating shaft of a wind vane rotating body to withstand wind, so that the rotating shaft can be rotated to drive a power generator to generate electrical power.

2. Description of the Related Art

The kinetic energy of air flow is called wind energy, which is a kind of reusable energy generated by air flow. In general, wind energy is a form of energy extracted from wind, for example, wind turbines can be used to generate electrical power, windmills can be used to generate mechanical power, wind pumps can be used to pump or drain water, or sails can be used to propel ships. In the Middle Ages and Ancient times, people used the mechanical energy collected by windmills to grind grain or pump water. In modern times, it is preferred to use turbine blades to convert mechanical energy of air flow into electrical energy, so as to form a power generator.

In general, when air flow rate becomes higher, wind can provide more kinetic energy. For example, a windmill can convert kinetic energy of wind into useful mechanical energy, and a wind turbine can convert kinetic energy of wind into useful electrical power. It is known in the art to transmit rotational power of a rotor, which is formed by fan blades driven by air flow, to a power generator via a transmission shaft. In 2008, the generated wind power worldwide reached 211.2 billion kWh and supplied only 1% of the total worldwide electricity consumption. However, in 2014, the global wind power generation has increased to 3% of the total worldwide electricity consumption. In recent years, for most countries, wind energy is not one of the major sources of energy but it has obviously grown by a factor of twenty-four from 2000 to 2015.

The existing conventional wind power generation methods can be classified into an axial-flow paddle method and a horizontal paddle method, according to wind power extraction type. In the axial-flow paddle method, the paddle surface has an inclined angle with the direction of wind, and the rotation direction of the paddle is perpendicular to a direction of wind. In the horizontal paddle method, the paddle surface is perpendicular to the direction of wind, so the paddle can form a larger area to rotate in a downwind direction, and form a smaller area in an upwind direction; however, the smaller area still causes resistance to the paddle, the way of changing the area of the paddle needs a transmission mechanism for control, and it results in higher complexity and manufacturing cost of the paddle mechanism, and also potentially causes higher difficulty in maintenance.

It is extremely necessary to adopt various considerations to effectively solve the problems listed above. Therefore, the present inventors develop a wind power generation device based on years of experience in this field, careful observation and study, and use of academic theory, so as to solve the above-mentioned problems.

SUMMARY OF THE INVENTION

In order to solve the conventional problems, one of objectives of the present invention is to provide a wind power generation device which is able to control the rotating paddles in a horizontal paddle method to prevent from producing air resistance even in an upwind condition, so as to capture more wind power to generate more electrical power.

In order to achieve the objective, the present invention provides a wind power generation device including a wind blocking structure, a wind vane rotating body and a power generator. The wind blocking structure is a box-shaped structure having a top opening and five planes, and is fixed on ground by a bottom plane thereof. Each of the corresponding planes (such as a left side plane and a right side plane) on two sides of the box-shaped structure is mounted and combined with a rotating shaft of the wind vane rotating body by a bearing. The wind vane rotating body is formed by disposing a plurality of vanes, having fixed areas, on the rotating shaft, so that the wind vane rotating body is rotatable in the wind blocking structure. The plurality of vanes are fixed on the rotating shaft and arranged at equal angle intervals, a terminal of the rotating shaft is connected to the power generator, and the power generator is fixed on a side of the wind blocking structure by a linking plate.

According to an embodiment of the present invention, heights of corresponding plates (such as a front plate and a rear plane) on front and rear sides of the wind blocking structure are close to that of the rotating shaft of the wind vane rotating body, so only one of vanes of the wind vane rotating body during rotation is protruded out of the wind blocking structure.

The front plate is in a flat plate shape and serves as a windward side of the box-shaped structure, and when wind appears in front of the wind blocking structure, the vane above the rotating shaft can withstand wind, and the other vanes below the rotating shaft do not withstand wind because the front plate of the wind blocking structure blocks the wind. The vane, withstanding wind, of the wind vane rotating body can drive the rotating shaft to rotate, so the power generator can be driven by the rotation power of the rotating shaft to generate electrical power.

Furthermore, the rear plane, the left side plane, the right side plane of the wind blocking structure comprise a plurality of holes disposed thereon, so when the wind blows into the box-shaped structure to drive the vanes of the wind vane rotating body to rotate to below the rotating shaft, the air in the wind blocking structure is pressed, and the pushed and pressed air can flow out through the plurality of holes or gaps in the box-shaped structure, thereby reducing static air resistance.

Furthermore, two wind power generation devices can be used to jointly drive one power generator. In other words, an embodiment of the present invention can include two wind vane rotating bodies and the wind blocking structures for accommodating the two wind vane rotating bodies, and in the case, the two rotating shafts of the wind vane rotating bodies are connected and combined in series to drive the same power generator, so as to produce more electrical power.

Further, in order to further improve the power generation efficiency of the wind power generation device of the present invention, the wind power generation device of the present invention can include a structure for enlarging the area of the vane, thereby increasing the area of the vane of the wind vane rotating body in a downwind condition, and retracting the area of the vane to an original area in an upwind condition. Each of the two different sides of each of the plurality of vanes can be connected to an area enlarging structure, and a flexible cloth made of windproof material can be connected between the area enlarging structures on the two sides of the vane. According to an embodiment of the present invention, each of the plurality of area enlarging structures includes a hollow circular cylinder connected to the side of the vane, a circular rod retractable in the hollow circular cylinder, a connection plate connected to the flexible cloth and the circular rod, a link rod connected to the connection plate, and a pulley fixed with the link rod.

Each of the two sides of the vane is connected to the hollow circular cylinder configured for insertion of a terminal of the circular rod, other terminal of the circular rod is connected to the connection plate and the flexible cloth. The flexible cloth has a certain area and is made of wind-resistant material, and a width between the two terminals on two sides of the flexible cloth is the same as that of the width of the vane, the terminal of the side of the flexible cloth is fixed to the other terminal of the circular rod, the other side of the flexible cloth is connected to the side of the vane. With this configuration, when the circular rod is extended out of or retracted into the hollow circular cylinder, the flexible cloth, which is connected to the circular rod, can be straightened or retracted, so as to change a windward area of the flexible cloth.

In detail, the pulley is fixed on the terminal of the link rod, the other terminal of the link rod is connected to the connection plate, the connection plate is connected to the flexible cloth and the terminal of the circular rod, and other terminal of the circular rod is retractably inserted into the hollow circular cylinder. The wind blocking structure includes slideway seats formed on the left side plane and the right side plane thereof, respectively, and each slideway seat includes a slideway disposed therein, and the pulley is moveable around in the slideway. When the pulley is moved around in the slideway, the link rod, the connection plate and the circular rod are driven to make the circular rod move in the hollow circular cylinder, thereby changing the windward area of the flexible cloth, as described above.

According to an embodiment of the present invention, the flexible cloth in the windward side can be extended in area to withstand pushing force of wind, and the circular rods connected to the remaining vanes, which are located below the rotating shaft, can be retracted into the hollow circular cylinders, and the flexible cloths connected thereto are not stretched and the remaining vanes are kept in the original areas thereof, so that the rotating shaft can have more rotation power because the enlarged area of the flexible cloth on the windward side, thereby increasing pushing force to drive the power generator to generate more electrical power.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 1:
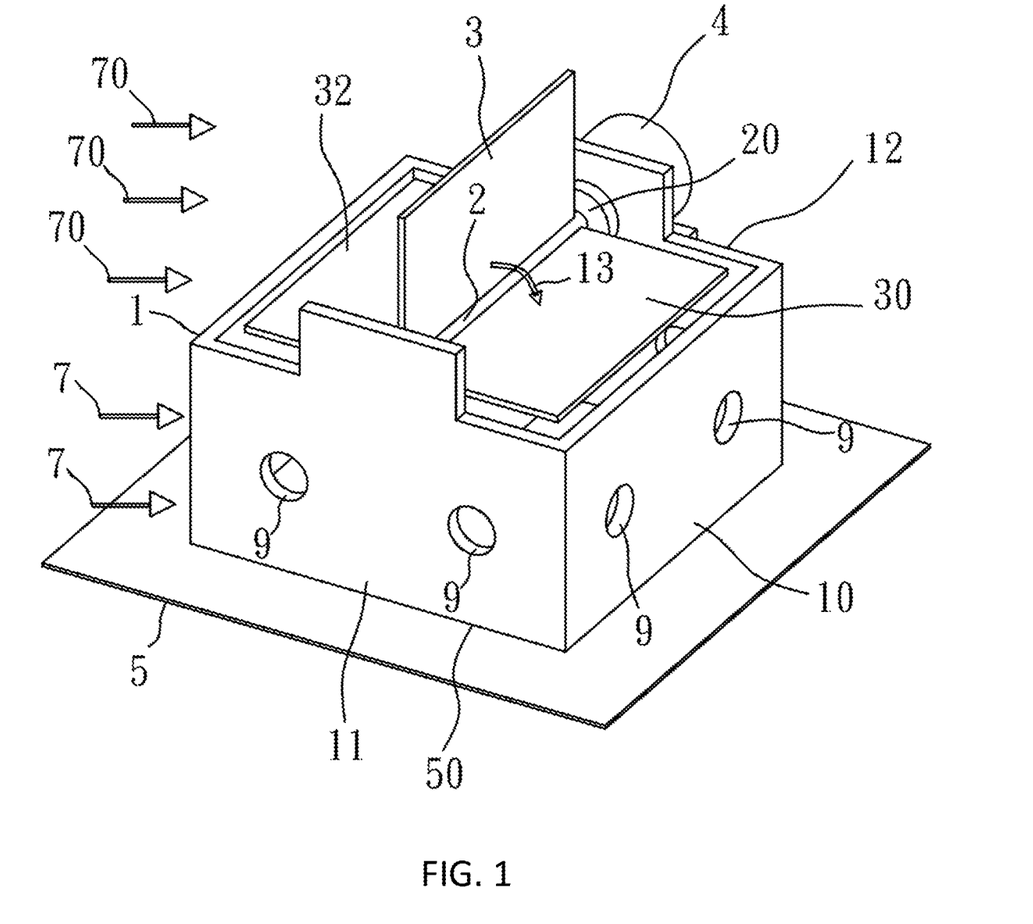
FIG. 1 is a perspective view of a wind power generation device according to an embodiment of the present invention.
Figure 2:
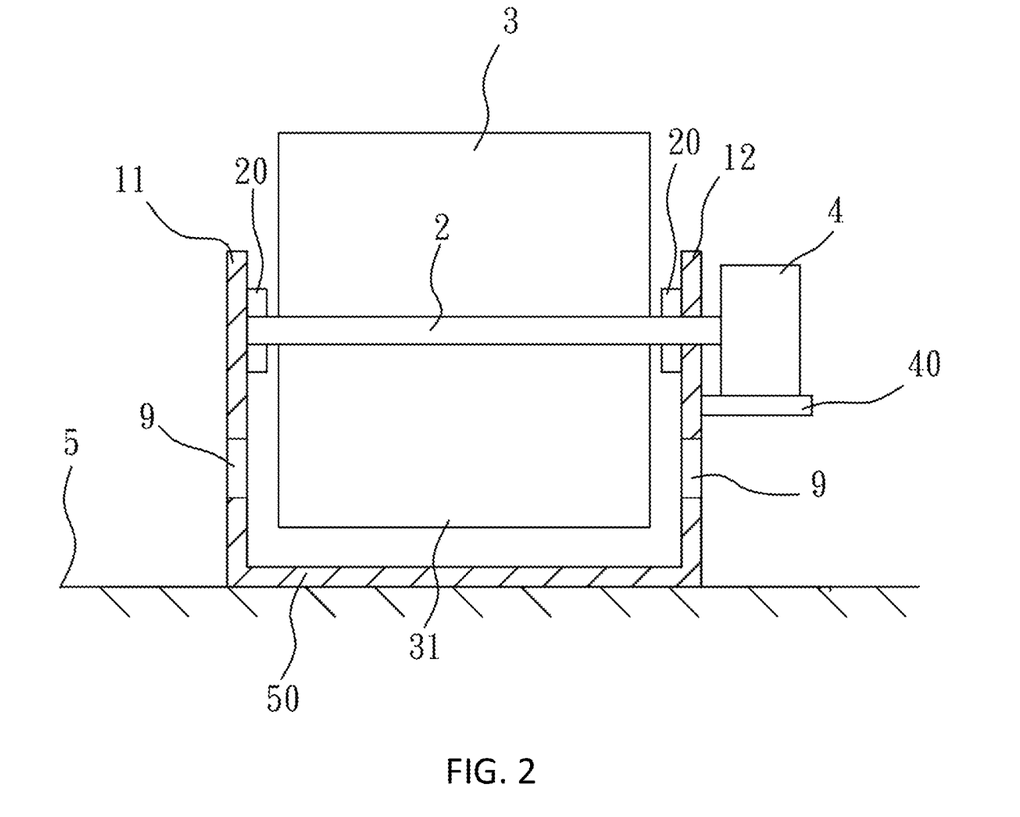
FIG. 2 is a sectional rear view of a wind power generation device according to an embodiment of the present invention.

An objective of the present invention is to provide a wind power generation device applied in a low energy condition. The wind power generation device of the present invention can control rotating paddles in a horizontal paddle method to prevent from producing resistance in the upwind direction, so as to capture more wind power and generate more electrical power. For better understanding technical content of the present invention, FIGS. 1 and 2 show schematic views of the wind power generation device of the present invention. FIGS. 1 and 2 are a perspective view and a sectional rear view of the wind power generation device according to a preferred embodiment of the present invention.

Figure 3:
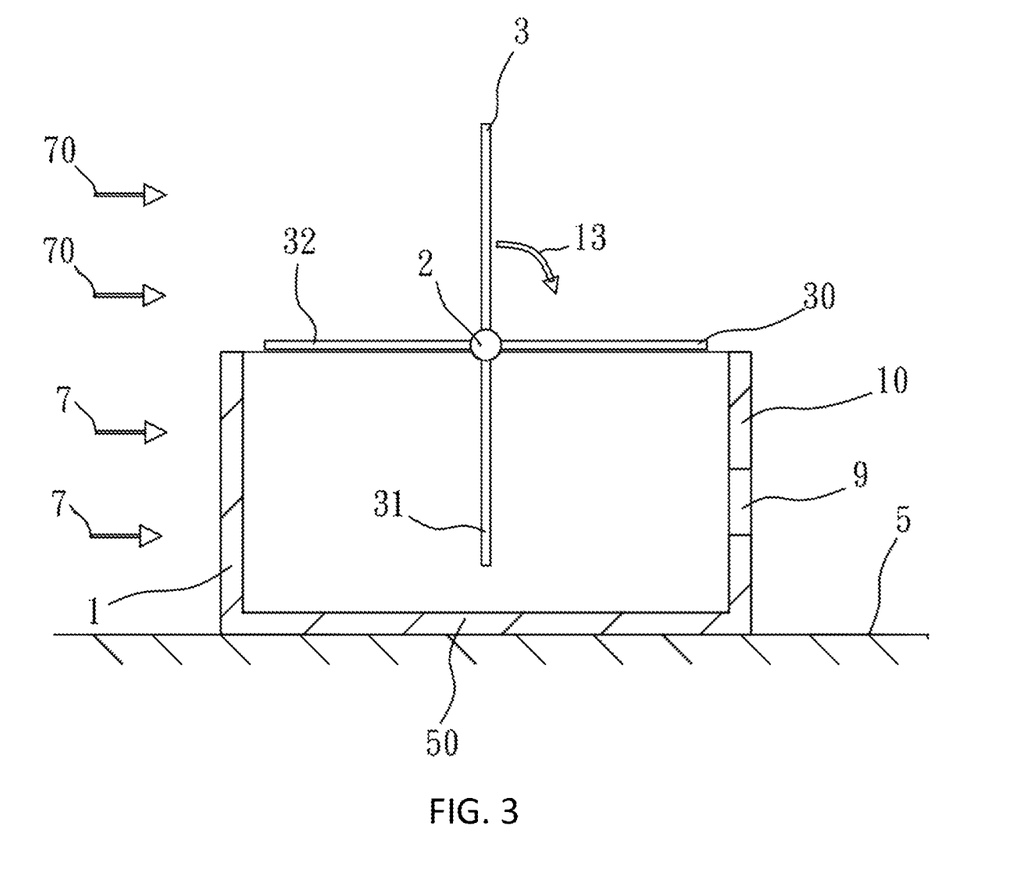
FIG. 3 is a sectional view showing vanes, withstanding wind, of a wind power generation device according to one embodiment of the present invention.

As shown in FIGS. 1 and 2, the wind power generation device of the present invention mainly includes a wind blocking structure, a wind vane rotating body, and a power generator. The wind blocking structure is a 3D box-shaped structure having a top opening, and includes five side plates connected to each other. The box-shaped structure comprises a front plate 1, a rear plane 10, a left side plane 11, a right side plane 12, and a bottom plane 50. The wind blocking structure is fixed on ground 5 by the bottom plane 50. According to an embodiment of the present invention, the front plate 1 is designed as a one-piece flat plate, and serves as a windward side of the box-shaped structure. The rear plane 10, the left side plane 11, the right side plane 12 have a plurality of holes 9 disposed thereon. Furthermore, as shown in FIG. 2, two bearings 20 are disposed on the left side plane 11 and the right side plane 12 on the two sides of the wind blocking structure, respectively, and the two bearings 20 are mounted and combined with a rotating shaft 2 of the wind vane rotating body, as shown in FIG. 3. The wind vane rotating body is formed by combining the rotating shaft 2 and a plurality of vanes 3, 30, 31 and 32 with fixed areas. The vanes 3, 30, 31 and 32 are fixed on the rotating shaft 2 and arranged at equal angle intervals, and the wind vane rotating body can be mounted and combined on the two bearings 20 of the wind blocking structure via the rotating shaft 2, so that the vanes 3, 30, 31 and 32 are rotatable in the box-shaped structure, such as in a direction 13 shown in FIGS. 1 and 3. The vanes 3, 30, 31 and 32 of the wind vane rotating body are rotatable in the wind blocking structure.

Please refer to FIG. 2. A terminal of the rotating shaft 2 of the wind vane rotating body is extended to connect the power generator 4 which is fixed on the right side plane 12 on a side of the wind blocking structure by a linking plate 40. According to an embodiment of the present invention, heights of the front plate 1 and the rear plane 10 on front and rear sides of the box-shaped structure of the wind blocking structure are close to a height of the rotating shaft 2 of the wind vane rotating body, as shown in FIG. 3, so only the vanes 3 of the vanes 3, 30, 31 and 32 of the wind vane rotating body can be protruded out of the wind blocking structure during rotation. In other words, the remaining vanes 30, 31, 32 are kept in the box-shaped structure of the wind blocking structure.

FIG. 3 is a sectional view showing the vanes 3, 30, 31 and 32 for withstanding wind, according to the wind power generation device of the preferred embodiment of the present invention. As shown in FIG. 3, when winds 7 and 70 appear in front of the wind blocking structure, the front plate 1 acts as a windward side, and the vane 3 protruded out of the wind blocking structure is subjected to pushing force of the wind 70. Furthermore, the wind 7 is blocked by the front plate 1 of the wind blocking structure, so the rotating vanes 30, 31 and 32 of the wind vane rotating body are not subjected to pushing force of the wind 7. According to an embodiment of the present invention, the rotating shaft 2 of the wind vane rotating body is rotated in a direction 13 by rotational power of the vane 3, so the vanes 30, 31 and 32 can also be rotated, and the vanes 3, 30, 31 and 32 of the wind vane rotating body can be swung below the rotating shaft 2, and the air in the wind blocking structure is pressed; the pushed and pressed air can flow out of the wind blocking structure through the holes 9 formed in the wind blocking structure or through the gaps of the wind blocking structure, thereby simultaneously reducing static air resistance of the wind power generation device of the present invention. In the case, the power generator 4 connected to the rotating shaft 2 can be driven by rotation power of the rotating shaft 2, to generate electrical power. As a result, the objective of the present invention can be achieved.

Figure 4:
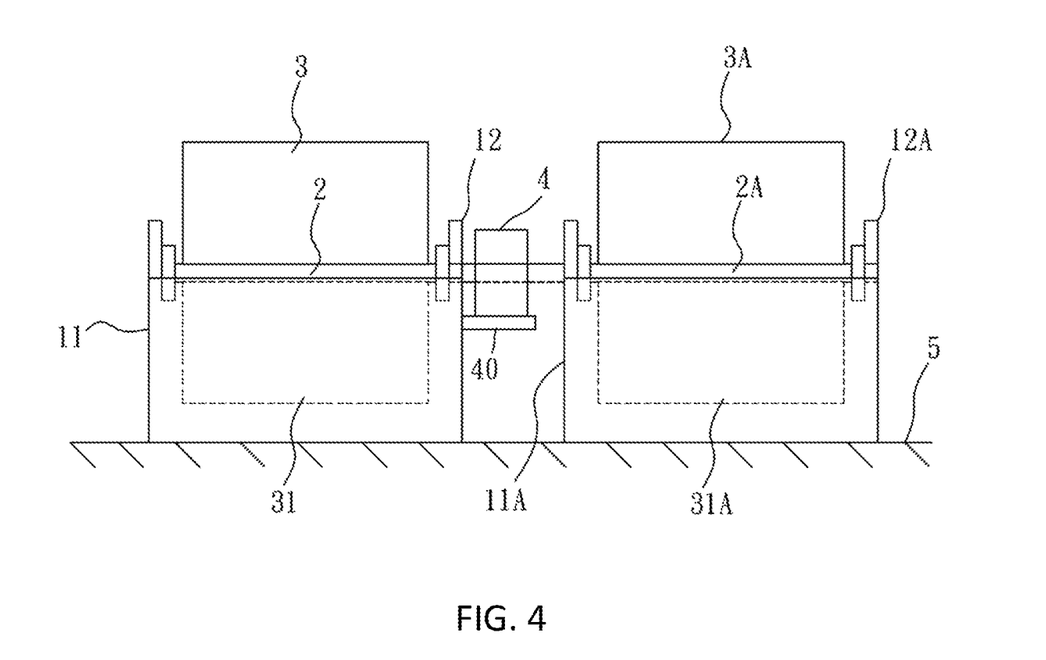
FIG. 4 is a schematic view of a wind power generation device using two wind vane rotating bodies connected in series to increase electrical power, according to another embodiment of the present invention.

Furthermore, in order to increase power generation benefit, the wind power generation device of the present invention can include two wind vane rotating bodies and two wind blocking structures for supporting the wind vane rotating bodies. Since limitation of view angle, only the left side plane 11 and the right side plane 12 of one of the wind blocking structures and the left side plane 11A and the right side plane 12A of another wind blocking structure are shown in FIG. 4. The two wind vane rotating bodies are used to jointly drive the same power generator 4. As shown in FIG. 4, when the rotating shaft 2 of the first wind vane rotating body and the rotating shaft 2A of another wind vane rotating body are connected in series and further jointly connected to and drive the power generator 4, it means that the vanes 3, 30, 31 and 32 of the first wind blocking structure drive the rotating shaft 2, and the vanes 3A, 31A, and front and rear vanes, not shown in FIG. 4, of another wind blocking structure drive the rotating shaft 2A, so that the serial combination can jointly drive the power generator 4 to further generate more electrical power, thereby achieving the objective of the present invention.

On the other hand, considering that the pushing force of the vane 3 can be increased by enlarging the windward area of the vane 3 when the vane 3 of the wind vane rotating body of the present invention is subjected to the wind 70, the present invention further discloses another embodiment. Please refer to FIGS. 5 to 8. According to another embodiment of the present invention, besides the aforementioned configuration of the wind blocking structure, the wind vane rotating body and the power generator, the wind power generation device can include a plurality of area enlarging structures to use additional flexible cloths to further increase the windward area of the vane 3, so as to increase pushing force of the wind vane rotating body. The configuration of the wind blocking structure, the wind vane rotating body and the power generator of this embodiment is the same as that of the first embodiment shown in FIGS. 1 to 3, so detailed description is not repeated. The area enlarging structure is a key point of implementation of this embodiment, so the technical feature and operation of the area enlarging structures are described in detail in following paragraphs.

In another embodiment of the present invention, two different sides of each of the vanes 3, 30, 31 and 32 comprise the area enlarging structures connected thereon, respectively, so that each of the flexible cloths 6, 60, 61 and 62 can be connected between the area enlarging structures on the two sides of each of the vanes 3, 30, 31 and 32. A width of each of the flexible cloths 6, 60, 61 and 62 is the same as that of the vanes 3, 30, 31 and 32. The flexible cloths 6, 60, 61 and 62 are made of windproof material.

According to another embodiment of the present invention, each of the area enlarging structures comprises a hollow circular cylinder 8, a circular rod 27 retractable in the hollow circular cylinder 8, a connection plate 26 connected to the circular rod 27 and one of the flexible cloths 6, 60, 61 and 62, a link rod 25 connected to the connection plate 26, and a pulley 24 fixed by the link rod 25. Each of the left side plane 11 and the right side plane 12 of the wind blocking structure comprises a slideway seat 21 formed thereon, each slideway seat 21 has a slideway 23 disposed therein, and the pulley 24 is moveable around in the slideway 23.

The two sides of each of the vanes 3, 30, 31 and 32 are connected to the hollow circular cylinders 8, respectively, each hollow circular cylinder 8 is configured for insertion of a terminal of the circular rod 27, and the other terminal of the circular rod 27 is connected to the terminals of the connection plate 26 and one of the flexible cloths 6, 60, 61 and 62. Each of the flexible cloths 6, 60, 61 and 62 has a certain area and is made of wind-resistant material, and a length of two terminals of a side of each of the flexible cloths 6, 60, 61 and 62 is the same as that of a side of each of the vanes 3, 30, 31 and 32, terminals of the side of each of the flexible cloths 6, 60, 61 and 62 are fixed with other terminals of the two circular rods 27, and other sides of the flexible cloths 6, 60, 61 and 62 are connected to the sides of the vanes 3, 30, 31 and 32, respectively, that is, when the two circular rods 27 are almost fully inserted into the hollow circular cylinder 8, the flexible cloths 6, 60, 61 and 62 are bent and shrunken to the sides of the vanes 3, 30, 31 and 32, such as the flexible cloth 61 shown in FIG. 5.

Figure 5:
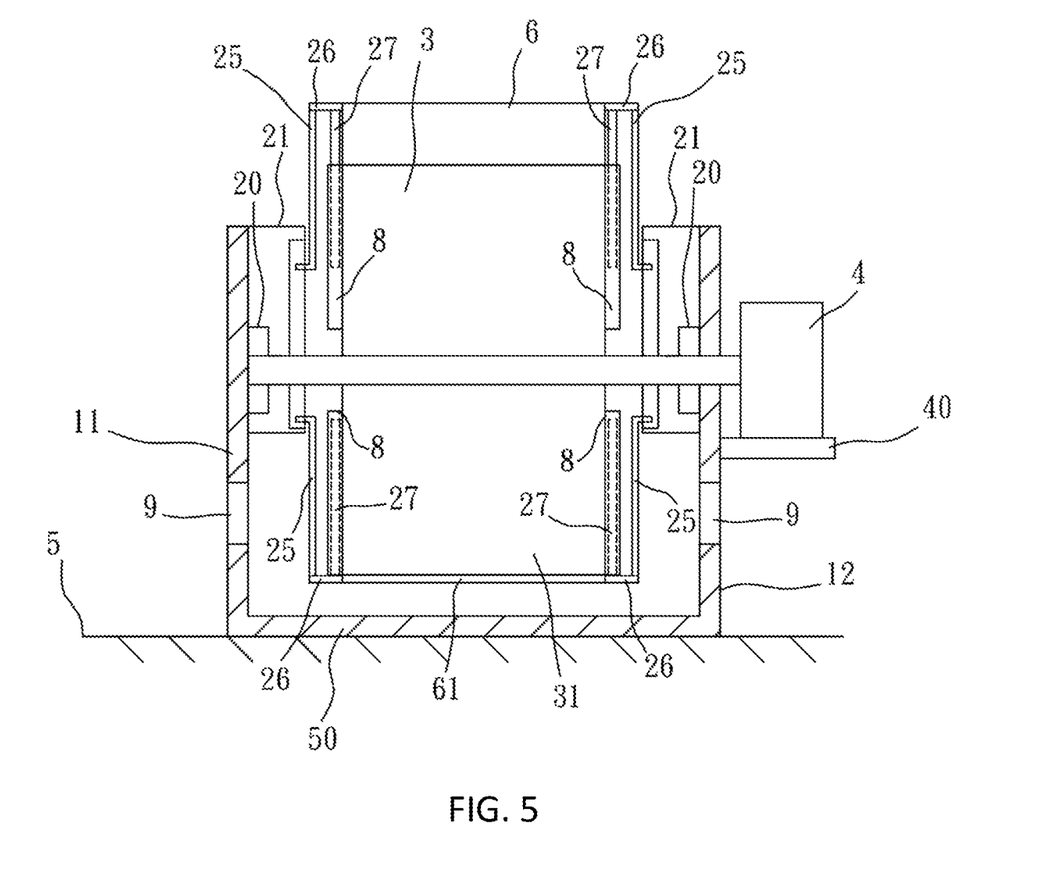
FIG. 5 is a sectional rear view of a wind power generation device using an area enlarging structure to increase a vane windward area, according to another embodiment of the present invention.
Figure 6:
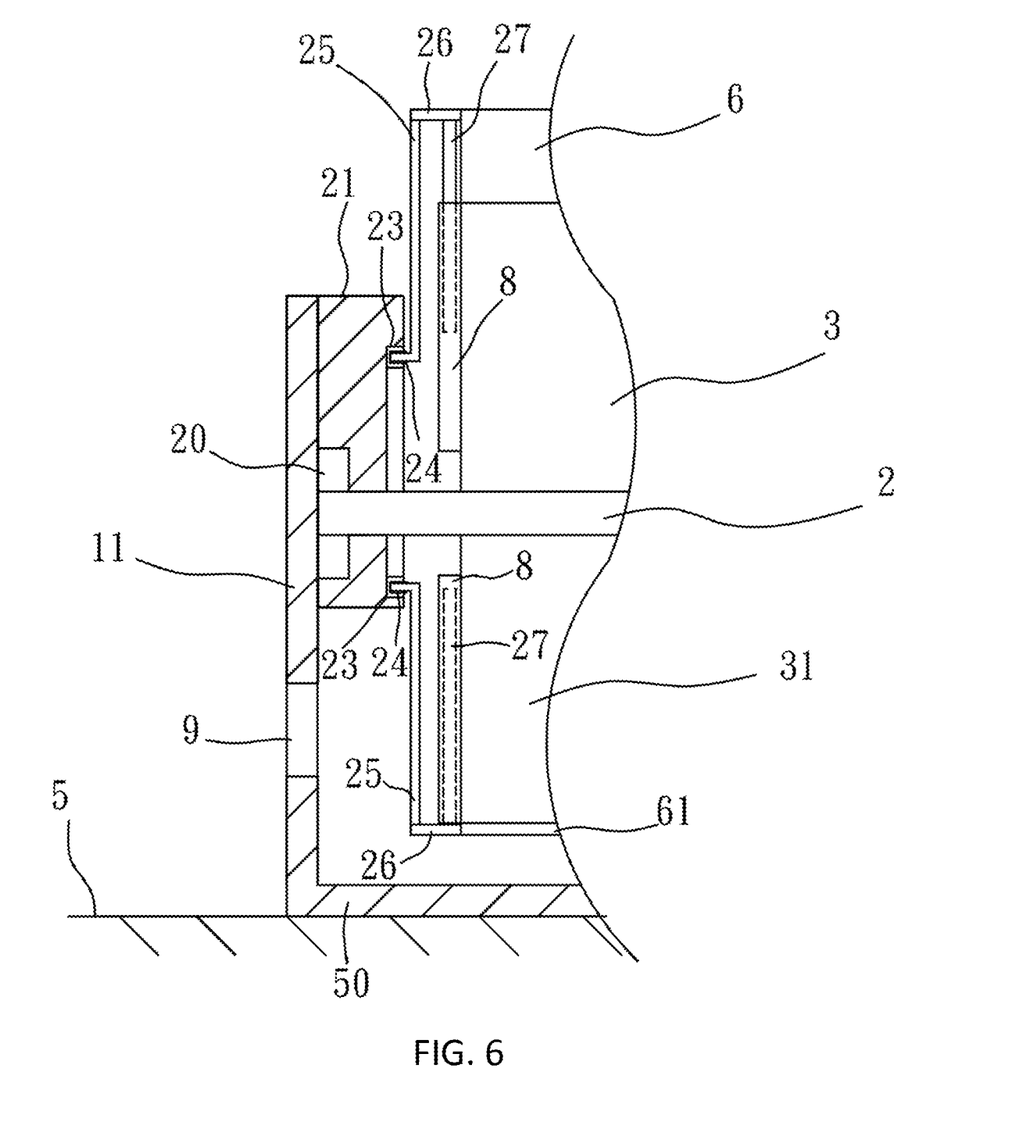
FIG. 6 is a sectional rear view of the slideway of FIG. 5.

When the circular rods 27 on two sides are slid out of the hollow circular cylinders 8 for a distance, the flexible cloths 6, 60, 61 and 62 can be straighten to enlarge areas, such as the flexible cloth 6 shown in FIG. 5. Therefore, the present invention can use the feature that the circular rod 27 can be extended out of or retracted into the hollow circular cylinder 8, so as to change the windward areas of the flexible cloths 6, 60, 61 and 62.

Figure 7:
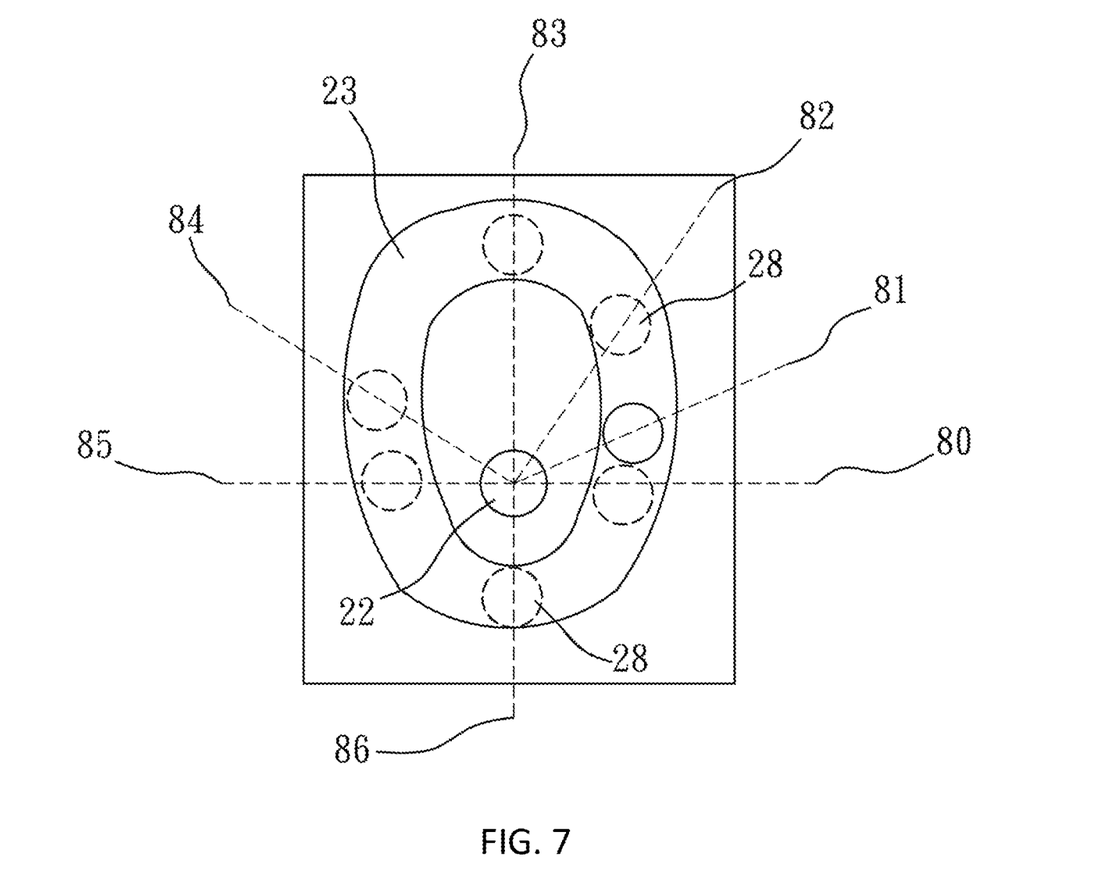
FIG. 7 is a schematic front view of the slideway of FIG. 5.

Please refer to FIG. 7. The slideway seat 21 can have a rotating shaft hole 22 configured for insertion of the rotating shaft 2 of the wind vane rotating body; the slideway seat 21 can also have the slideway 23 as a travel path where the pulley 24 rotates around the rotating shaft hole 22 one turn, so that the slideway 23 can be used to control a position of the rolling pulley 24. According to an embodiment of the present invention, the pulley 24 is fixed on the terminal of the link rod 25, the other terminal of the link rod 25 is connected to the connection plate 26, and the other terminal of the connection plate 26 is connected to the terminal of the circular rod 27; in other words, when the pulley 24 is rolling along the slideway 23, the link rod 25, the connection plate 26 and the circular rod 27 are moved simultaneously in the hollow circular cylinder 8, so as to make the flexible cloths 6, 60, 61 and 62, connected to the circular rod 27, straighten or retract, thereby changing the windward areas of the flexible cloths 6, 60, 61 and 62.

Please refer to FIG. 7, shows a front view of a slideway of an area enlarging structure for increasing the windward area of the vane, according to an embodiment of the present invention. The pulley position 28 represents a position of the pulley 24 moving around one turn in the slideway 23. Directions 80 and 85 represent a horizontal state, and the position between the direction 80, a direction 86 and the direction 85 represents that the vane is located below the horizontal state, and it indicates that the vanes 3, 30, 31 and 32 are moving around half turn in the wind blocking structure, and a distance between the pulley 24 and the rotating shaft hole 22 is fixed; on the other hand, the position between the directions 80, 81, 82, 83, 84 and 85 represents that the vane is located above the horizontal state, and it also indicates that the vanes 3, 30, 31 and 32 are moved around half turn above the wind blocking structure, and a distance between the pulley 24 and the rotating shaft hole 22 is varied, and the maximal value exists in the direction 83 toward above the vane.

In other words, according to the area enlarging structure of another embodiment of the present invention, the sides of the flexible cloths 6, 60, 61 and 62 are connected to the vanes 3, 30, 31 and 32 of the wind vane rotating body, respectively, and another sides of the flexible cloths 6, 60, 61 and 62 are controlled by movement of the pulley 24 in the slideway seat 21, so as to control the flexible cloths 6, 60, 61 and 62 to extend and enlarge the areas thereof or retract to the original areas thereof, according to the positions of the vanes of the wind vane rotating body.

Figure 8:
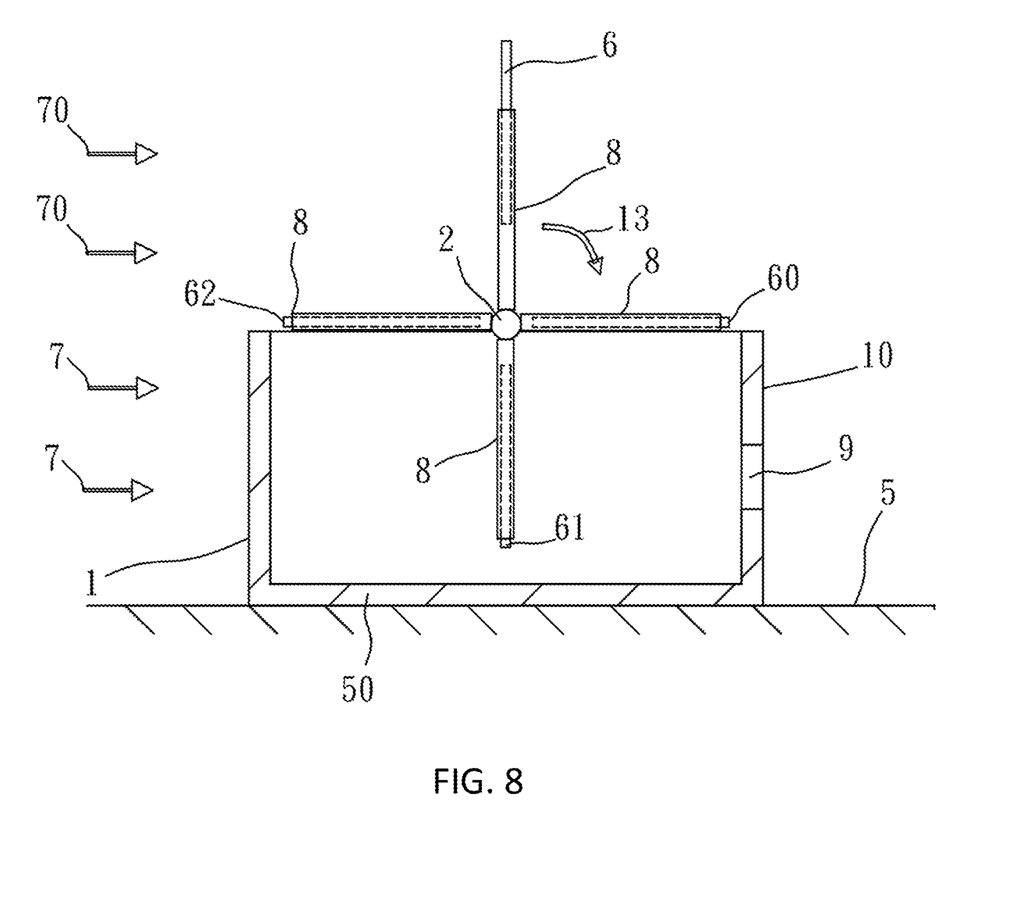
FIG. 8 is a sectional view of a wind power generation device using an area enlarging structure to increase a vane windward area for withstanding wind, according to another embodiment of the present invention.

Please refer to FIG. 8, which is a section view of a wind power generation device using the area enlarging structure to increase a vane windward area to withstand more wind, according to another embodiment of the present invention. When the winds 7 and 70 appear, the circular rods 27 in the hollow circular cylinders 8 on two sides of each of the vanes 3, 30, 31 and 32 are moved by the pulley 24 which is controlled along the slideway 23. In the position of the vane 3 shown in FIG. 3, the circular rod 27 is extended to the maximum distance to form the largest area of the flexible cloth 6, as shown in FIG. 8, thereby enlarging the area to withstand pushing force of the wind 70. In positions of the vanes 30, 31 and 32, shown in FIG. 3, the circular rods 27 corresponding to the vanes 30, 31 and 32 are retracted into the hollow circular cylinders 8, such as the flexible cloths 60, 61, and 62 shown in FIG. 8, so that the areas of the vane 30, 31, and 32 are kept as the original areas of the vane 30, 31, and 32, respectively, and the vanes 30, 31, and 32 stay in the wind blocking structure and are not subjected to pushing force of the winds 7 and 70; in the case, because of the enlarged area of the flexible cloth 6, the rotating shaft 2 of the wind vane rotating body can have more rotation power to increase pushing force thereof, so as to drive the power generator 4 to generate more electrical power. This embodiment is an inventive feature of another embodiment of the present invention.

According to above-mentioned contents, it is obvious that compared with the prior art, the wind power generation device of the present invention using the vane located above the rotating shaft of the wind vane rotating body to withstand wind to rotate the rotating shaft to drive the power generator to generate electrical power can provide a designer with a more intuitive operation mode, and can effectively save the manufacturing cost of the wind power generation device and also solve the problem of high manufacturing complexity of the conventional wind power generation device.

Furthermore, the wind power generation device of the present invention can further control the windward area of the vane by connecting multiple wind blocking structures and wind vane rotating bodies in series, or using the area enlarging structures and the flexible cloths made of windproof material and having adjustable areas. Using the flexible cloths to enlarge windward area can increase the pushing force of the vane to drive the power generator, so as to generate more electrical power. As a result, the wind power generation device of the present invention has excellent industrially applicability and is more competitive.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A wind power generation device, comprising:
a wind blocking structure formed as a box-shaped structure having a top opening, wherein the box-shaped structure comprises a bottom plane, and the box-shaped structure is fixed on ground by the bottom plane, and the box-shaped structure comprises a windward side configured to receive power of wind, and the wind blows through a plurality of holes on a travel path in the box-shaped structure;
a wind vane rotating body comprising a rotating shaft and a plurality of vanes, wherein the plurality of vanes are fixed on the rotating shaft and arranged at equal angle intervals, the wind vane rotating body is mounted and combined with two bearings of the wind blocking structure via the rotating shaft, and configured to rotate the plurality of vanes in the box-shaped structure, and wherein the box-shaped structure comprises a front plate, a rear plane, a left side plane, and a right side plane, the front plate is in a flat plate shape and serves as the windward side of the box-shaped structure, the rear plane, the left side plane and the right side plane comprise the plurality of holes formed thereon, so that the wind blows into the box-shaped structure to drive the plurality of vanes to rotate below the rotating shaft, to further press air, and the pushed and pressed air flows out of the box-shaped structure through the plurality of holes, and wherein the two bearings are disposed on the left side plane and the right side plane of the box-shaped structure, respectively;
a power generator connected to the rotating shaft, and fixed on a side of the box-shaped structure by a linking plate, wherein when the wind blows to the wind blocking structure to rotate the wind vane rotating body, the power generator is driven by rotation power of the rotating shaft to generate and output electrical power, and wherein the power generator is fixed on the right side plane of the box-shaped structure by the linking plate, and wherein heights of the front plate and the rear plane of the box-shaped structure are close to that of the rotating shaft of the wind vane rotating body, so that one of the plurality of vanes protrudes out of the wind blocking structure, and the remaining of the plurality of vanes are kept inside the box-shaped structure; and
a plurality of area enlarging structures, wherein two different sides of at least one of the plurality of vanes are connected to the plurality of area enlarging structures, respectively, and wherein a flexible cloth is connected between the plurality of area enlarging structures on the two different sides of the vane, and each of the plurality of area enlarging structures comprises a hollow circular cylinder connected to one of the two different sides of the vane, a circular rod retractable in the hollow circular cylinder, and a connection plate connected to the flexible cloth and the circular rod, and the circular rod is retractable into the hollow circular cylinder, to change a windward area of the flexible cloth.

2. The wind power generation device according to claim 1, further comprising a second wind blocking structure configured to hold a second wind vane rotating body which comprises a second rotating shaft, wherein the rotating shaft of the wind vane rotating body and the second rotating shaft of the second wind vane rotating body are connected in series to the power generator, so as to generate more electrical power.

3. The wind power generation device according to claim 1, wherein each of the plurality of area enlarging structures comprises a link rod connected to the connection plate, and a pulley fastened with the link rod, each of the left side plane and the right side plane of the box-shaped structure comprises a slideway seat formed thereon, and the slideway seat comprises a slideway formed therein, and the pulley is moveable around in the slideway.

4. The wind power generation device according to claim 3, wherein the pulley is fixed on a terminal of the link rod, and other terminal of the link rod is connected to the connection plate, the connection plate is connected to the flexible cloth and a terminal of the circular rod, other terminal of the circular rod is retractable into the hollow circular cylinder, and when the pulley is moved inside the slideway, the circular rod is driven to move inside the hollow circular cylinder, so as to change the windward area of the flexible cloth.

5. The wind power generation device according to claim 4, wherein widths of the flexible cloth and the plurality of vanes are the same.

6. The wind power generation device according to claim 4, wherein the slideway seat comprises a rotating shaft hole formed therein and configured for insertion of the rotating shaft of the wind vane rotating body.

7. The wind power generation device according to claim 6, wherein the slideway is a travel path where the pulley rotates around the rotating shaft hole one turn.

8. The wind power generation device according to claim 7, wherein when the pulley is rotated one turn in the slideway, a distance between the pulley and the rotating shaft hole is varied, and a maximal value of the distance exists in the direction toward above the vane.

* * * * *